No. 621,847. Patented Mar. 28, 1899.
W. M. PENDLEY.
COTTON OR CORN PLANTER.
(Application filed June 13, 1898.)
(No Model.) 3 Sheets—Sheet 1.
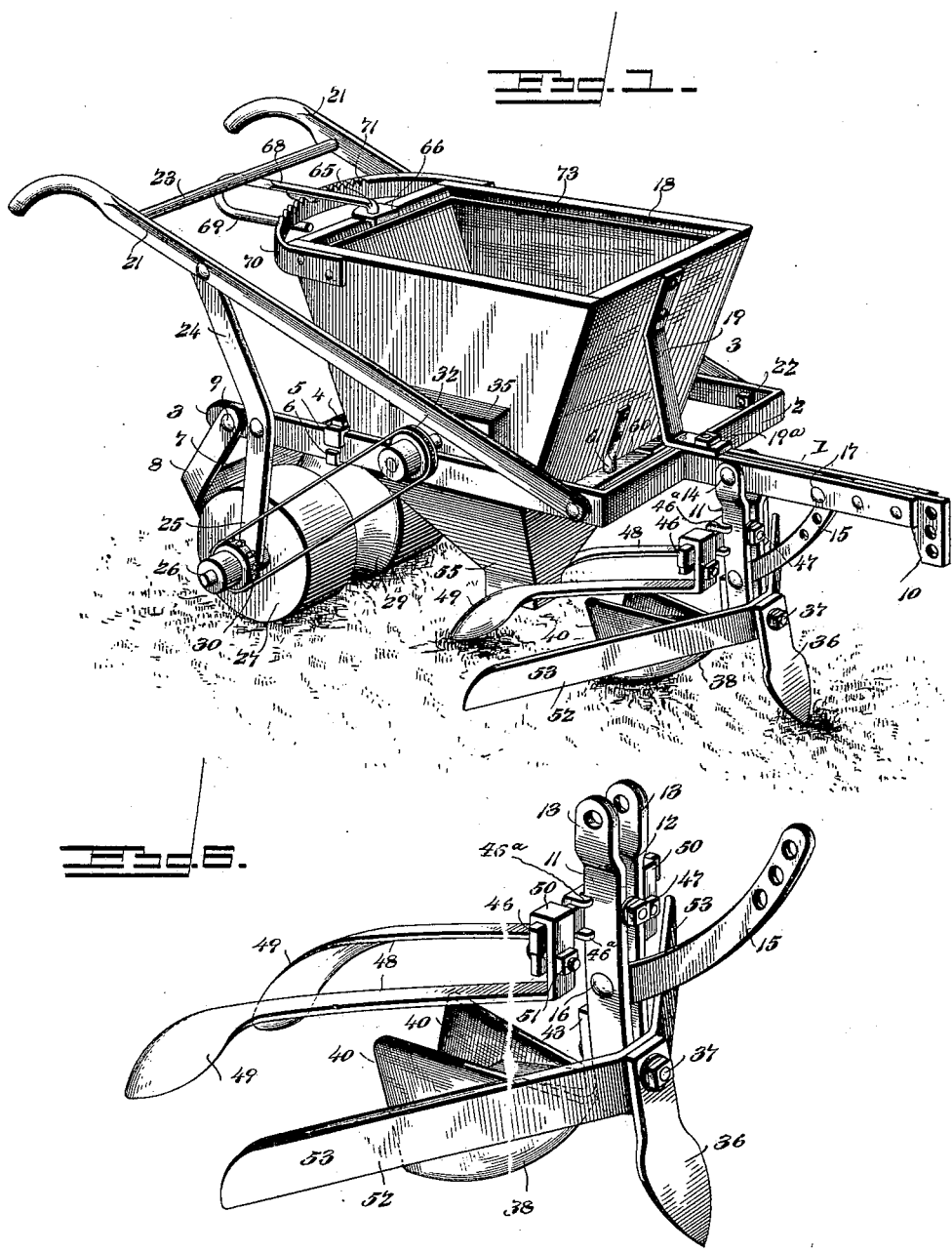
Witnesses
E. F. Stewart
H. H. Beacher
William M. Pendley, Inventor
By his Attorneys,
C. A. Snow & Co.

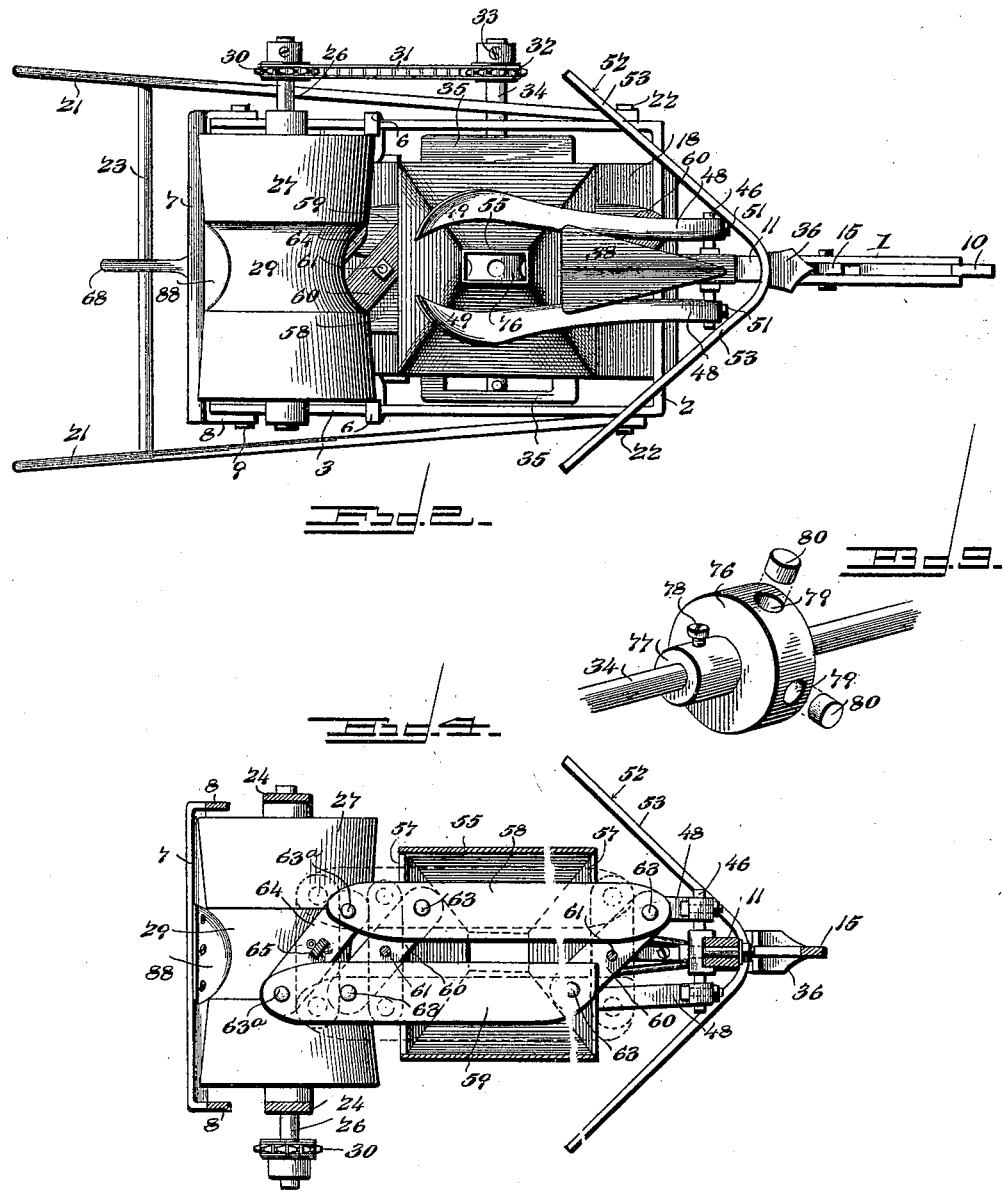

No. 621,847. Patented Mar. 28, 1899.
W. M. PENDLEY.
COTTON OR CORN PLANTER.
(Application filed June 13, 1898.)
(No Model.) 3 Sheets—Sheet 3.
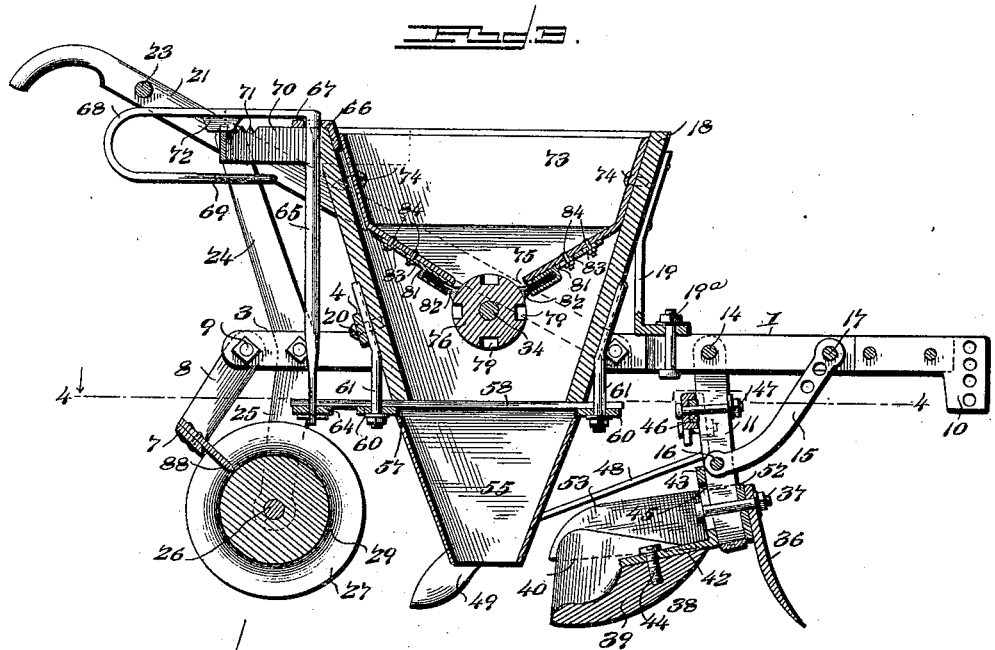
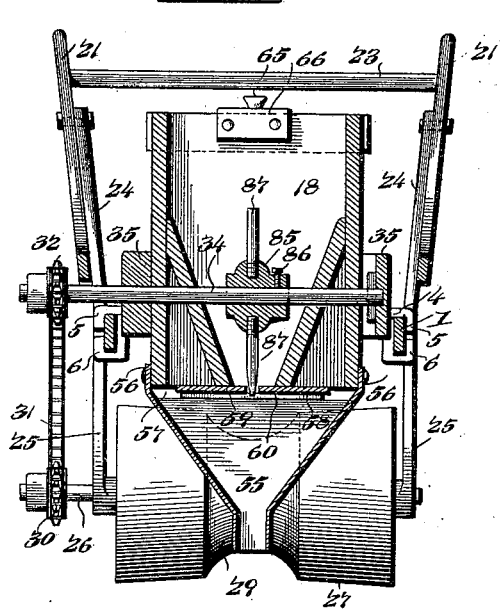
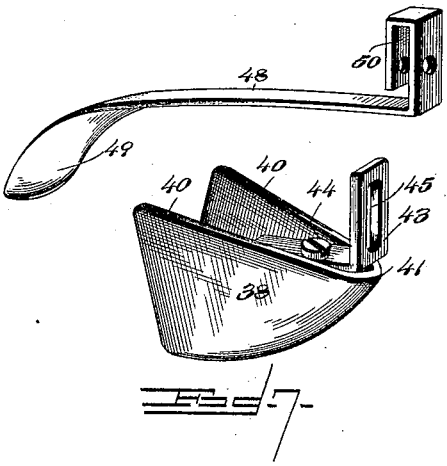
Witnesses William M. Pendley, Inventor
By his Attorneys,

UNITED STATES PATENT OFFICE.

WILLIAM M. PENDLEY, OF SPRING PLACE, GEORGIA.

COTTON OR CORN PLANTER.

SPECIFICATION forming part of Letters Patent No. 621,847, dated March 28, 1899.

Application filed June 13, 1898. Serial No. 683,339. (No model.)

*To all whom it may concern:*

Be it known that I, WILLIAM M. PENDLEY, a citizen of the United States, residing at Spring Place, in the county of Murray and State of Georgia, have invented a new and useful Cotton or Corn Planter, of which the following is a specification.

My invention relates to improvements in machines for planting corn or cotton-seed and for distributing fertilizer; and the primary object that I have in view is to provide a machine for preparing the land which may be used for dropping different kinds of seed and adjusted to adapt the dropping devices for discharging fertilizer in regulated quantities.

A further object of the invention is to provide a common means for carrying a sweep to clear away obstructions in the path of the machine, to depress the soil on opposite sides of the furrow and thus insure uniformity in the depth of planting the grain, and to provide means for throwing the soil inwardly upon the grain after the latter shall have been deposited in the furrow, all of said devices being adjustable to plant the grain in the ground at the desired depth.

With these ends in view the invention consists in the novel combination of elements and in the construction and arrangement of parts, which will be hereinafter fully described and claimed.

To enable others to understand the invention, I have illustrated a preferred embodiment thereof in the accompanying drawings, forming a part of this specification, and in which—

Figure 1 is a perspective view of a planter and fertilizer-distributer constructed in accordance with my invention. Fig. 2 is an inverted or bottom plan view of the machine. Fig. 3 is a longitudinal vertical sectional elevation taken centrally through the machine. Fig. 4 is a horizontal sectional plan view on a plane above the adjustable cut-off mechanism below the hopper, the plane of section being indicated by the dotted line 4 4 of Fig. 3. Fig. 5 is a vertical transverse section through the machine adjusted for service in planting cotton-seed and distributing fertilizer. Fig. 6 is an enlarged detail perspective view of the stock or foot with the various appliances thereon. Fig. 7 is a detail perspective view of the furrow-depressor. Fig. 8 is a similar view of one of the covering blades or shovels. Fig. 9 is a detail view of the corn-dropping disk.

Like numerals of reference denote like and corresponding parts in each of the several figures of the drawings.

1 designates the horizontal main frame, which carries all the operative devices of the implement and which consists, preferably, of two metallic bars, which are bent laterally in opposite directions, as at 2, and then carried rearwardly, as at 3, in parallel relation to each other. The adjacent front ends of the frame-bars 1 are united rigidly together by suitable transverse bolts to form the beam of the implement; but the parallel rear ends 3 are spaced apart a sufficient distance to accommodate between themselves the seed-hopper. These spaced rear ends 3 of the carrying-frame are united and braced by a transverse bar 4, which lies in rear of the hopper and has its extremities turned and flanged, as at 5, to embrace the rear lengths 3 of the frame-bars, and these flanged ends of the brace 4 are secured rigidly to the frame-bars by the hook-bolts 6, arranged in vertical positions on opposite sides of the frame to have their lower hooked ends engage with the frame-bars, while the upper threaded ends pass through suitable openings in the brace 4 and receive the clamping-nuts. The brace-bar 4 is united to the frame-bars at a point immediately in rear of the hopper in order that the bar 4 may be secured to said hopper to assist in supporting the latter on the frame; but the rear lengths 3 of the frame-bars are extended beyond the brace-bar 4 to receive a rear frame-bar 7, the latter also serving to support the scraper to keep the groove clear of dirt in the presser-roller. This rear bar 7 extends transversely across the frame, so as to lie below the horizontal plane of said frame, and the ends of the bar 7 are bent to produce the inclined arms 8, the upper forward ends of which are fixedly secured by the bolts 9 to the rear extremities of the rear lengths 3, forming a part of the main frame. Between the united adjacent ends of the frame-bars, at the front of the implement, is secured a clevis 10, which is provided with a vertical row of transverse openings adapted to receive the draft attachment, which may be fitted in either of said openings to change the line of draft on the implement.

11 designates the foot or stock, which is firmly secured to the beam formed by the adjacent front ends of the frame-bars. This foot or stock is formed of a single length of metal, which is doubled upon itself to provide a loop at the lower end of the foot and to produce a longitudinal vertical slot 12. The upper bent ends 13 of the foot overlap the sides of the beam to receive a fastening-bolt 14, that rigidly attaches the foot to said beam, and this foot or stock is braced by an inclined brace 15, the lower end of which is fastened by the bolts 16 to the stock, while its upper end is adjustably secured to the beam by a bolt 17, adapted to fit in either one of a series of openings formed in the brace 15.

18 designates the primary hopper, which is supported on the rear length 3 of the main frame 1. In practice I prefer to make this hopper of wood and to give to the end walls thereof an upward flare; but the material employed in the construction of the hopper and the particular shape thereof are not essential features of my invention. The front end of this hopper is supported on the frame 1 by a vertical fastening-strap 19, which is rigidly secured to the front of the hopper and is bent at its lower end to form a foot-flange, through which passes a securing-bolt 19ª; but the rear wall of this hopper is secured, as at 20, to the transverse brace 4, which unites the rear lengths of the frame-bars.

The handles 21 of the implement are bolted at the lower front ends at 22 to the frame-bars, and they are united by a tie-bar 23. The handles are braced by the vertical bars 24, which are bolted to the handles and to the frame-bars, and the lower ends of these braces 24 are extended, as at 25, below their attachment to the frame-bars. The lower extremities of these vertical braces 24 are provided with suitable openings or bearings for the reception of a rotary axle 26, which lies in rear of the hopper and extends transversely across the machine. Secured rigidly to this rotary axle is a covering or pressure roller 27, the length of which is coextensive with the width of the main carrying-frame at its widest point, and this covering and presser roller is formed or constructed with a circumferential groove 29, adapted to leave a ridge of earth immediately over the furrow, in which the grain is deposited, covered, and pressed by the action of certain elements of my machine. The contact of the covering and presser roller with the ground when the machine is drawn across a field insures rotary motion to the roller and its axle 26, and this motion is communicated through intermediate gearing with the rotary dropping devices fitted in operative relation to the hopper. In the preferred form of the gearing I employ a sprocket-pinion 30, which is rigidly secured to an extended end of the rotary axle 26, and with this sprocket-pinion engages an endless sprocket-chain 31, which operates a sprocket-wheel 32, that is secured detachably by a screw 33 to an extended end of the dropping-shaft 34. This dropping-shaft is arranged horizontally to occupy a transverse position within the bottom of the hopper 18, and it is journaled in suitable bearings 35, which are rigidly secured to the side walls of the hopper 18, on the outside thereof.

The opener for the furrow consists of a suitable blade or shovel 36, which is adapted to be fitted against the closed front end of the seat, presently referred to, and this furrow-opener is secured detachably and adjustably to the stock 11 by a bolt 37.

To insure uniformity in the depth of the furrow and thereby plant the grain uniformly in the furrows, I employ a depressing-gage 38, which is constructed peculiarly for packing the soil against opposite sides of the furrow. This gage consists of a foot 39, which is cast in a single piece of metal in substantially a wedge-shaped form, and the side faces 40 of this depressing-gage diverge rearwardly from the front edge or prow 41 to the broad rear end of said gage. The front edge or prow 41 of the wedge-shaped foot 39 is inclined upwardly and forwardly, as shown by the drawings, and in the upper side of this foot is produced a socket 42, adapted for the reception of the vertical carrier-bar 43. The horizontal length of this carrying-bar is fitted snugly within the socket of the foot and secured firmly thereto by a bolt 44; but the vertical length of said bar 43 is slotted longitudinally at 45 and arranged to bear against the rear edge of the stock or foot 11, so as to be secured thereto by a bolt 37, which unites the furrow-opener and the sweep, presently described, to the stock.

A horizontal carrying-bar 46 is arranged transversely across the stock or foot 11, at the rear side thereof, and this bar 46 extends beyond both sides of the stock, to which it is secured centrally by a bolt 47, which passes through the slot or opening 12 of the stock and a suitable central opening in the horizontal bar 46. The headed end of the bolt bears against the bar 46, while its threaded end receives a washer and nut, by which the bolt and bar may be secured to the foot or stock for adjustment vertically thereon, and said carrying-bar is also provided with flanges 46ª, adapted to embrace the sides of the foot or stock, so as to hold the bar in position on the foot against deflection in a vertical plane, thus insuring the proper horizontal position to the transverse carrying-bar. This bar 46 sustains the covering shovels or blades 48, two of which are preferably employed and are disposed to lie on opposite sides of the depending spout from the hopper. These covering-shovels 48 assume inclined positions between the transverse bar 46 and the ground-line, and the heels of said shovels are broadened and turned inwardly, so as to approximately face each other, thereby forming deflected heels 49, arranged to throw the soil from opposite sides into the furrow and cover the seed or grain after the latter shall have been deposited in the furrow. The front upper ends of these inclined shovels are clamped to the carrying-bar for horizontal adjustment thereon, and as the carrying-bar is attached to the foot or stock for vertical adjustment on the latter the shovels may also be adjusted vertically with the carrying-bar, thereby giving to the shovels a range of adjustment to regulate the amount of soil which may be thrown upon the seed deposited in the furrow. The front ends of the shovels are bent upwardly in a vertical direction, then rearwardly, and then downwardly to form the clasps 50, which are adapted to be slipped over the transverse bar 46, and these clasps receive the bolts 51, which pass through the clasps below the transverse bar 46 and are adapted to compress said clasps sufficiently to insure tight engagement between the clasps and the bar, so as to hold the shovels firmly in their adjusted positions on said bar 46. The shovels are thus adapted to be clamped independently to the carrying-bar on opposite sides of the foot or stock, and each shovel may be detached, replaced, and changed in position without reference to the other shovel. As the carrying-bar lies above the furrow-opener, a depressor-gage, and the sweep, the clasp-shaped ends of the covering-blades are readily accessible for adjustment.

52 designates the sweep, which is attached to the foot or stock and is arranged thereon to clear away clods and other obstructing matter in the path of the machine and to level the ground as the machine advances across the field. This sweep lies in a horizontal position, and it consists of a single bar or length of metal, which is bent at its middle to form the diverging wings 53. The middle portion of said sweep is interposed between the front side of the stock and the furrow-opener, and through said portion of the sweep passes the bolt 37. It will be observed that this bolt 37 serves to attach the furrow-opener and the vertical carrying-stem 43 of the depressor-gage 38 to the stock, as well as to fasten the sweep to the stock, thus uniting all the parts by a single fastening. The bolt 37 passes through the slot 12 in the foot or stock, so as to adjust the sweep or furrow-opener uniformly in a vertical direction; but as the depressor-gage has its shank provided with a slot this gage may be adjusted independently of the opener and sweep, so as to vary the depth of the furrow more or less, according to the nature of the grain which is to be planted in the furrow.

The seed or fertilizer is conducted from the hopper and properly deposited in the furrow by a flaring spout 55, the upper edge of which is flared or flanged at 56 to embrace the lower edges of the hopper 18, to which said spout is detachably secured in a suitable way, and at its front and rear the upper part of this spout 55 is formed with the horizontal slots 57, which lie transversely across the machine and accommodate the variable cut-off mechanism, by which the machine may be adapted for dropping cotton-seed or fertilizer. This variable cut-off mechanism consists of a pair of laterally-adjustable gage-plates 58 59 and means for simultaneously moving said gage-plates uniformly toward or from each other. The gage-plates 58 59 are arranged in horizontal positions at the bottom of the hopper 18, and the ends thereof extend or protrude through the slots 57 in the spout 55, upon which the gage-plates snugly fit. These gage-plates are pivotally attached, as at 63, to the idle-levers 60, arranged, respectively, at the front and rear of the hopper, and each lever 60 is fulcrumed centrally on a vertical bar 61, which is fastened securely to an end wall of the hopper, whereby the levers are supported in place on the hopper to assist in sustaining the gage-plates in proper position between the hopper and the conducting-spout 55. The rear ends of the gage-plates are extended beyond their pivotal connection 63 with the rear idle-lever 60, and to said extended ends of the gage-plates are pivotally attached, as at 63ª, the ends of a horizontal operating-lever 64. This operating-lever lies in rear of and exterior to the hopper, and it is secured centrally to a vertical shaft 65, which is supported at its upper end in a bracket-plate 66, that is flanged at 67 and secured firmly to the upper edge of the rear hopper-wall. On the upper extremity of this vertical operating-shaft is secured a horizontal handle 68, which is in convenient reach of the operator, and this operating-handle has its free rear end doubled or bent upon itself to form a spring-arm 69, that lies below the handle 68 and in parallel relation thereto. A holding-segment 70 is secured rigidly to the hopper in a horizontal position to extend rearwardly therefrom, and this segment lies between the handle 68 and its spring-arm 69 for said parts to engage with said segment. In the upper edge of the holding-segment is formed a series of detaining-teeth 71, with either of which may engage a locking-tooth 72, which is provided on the handle 68 at a point proper for the engagement of said tooth with the toothed segment, and thus the handle is adapted to be held in engagement with the segment, which serves to prevent the shaft from turning and the gage-plates from being jarred out of their adjusted positions when the machine is in service in the field.

In using my machine for planting corn I employ an insertible hopper, which is preferably constructed of metal and is secured removably within the primary hopper 18 to sustain the weight of the load of grain which may be placed in the machine, and in connection with this insertible hopper a rotary corn-dropping disk is employed, which dropping-disk is secured fast to the dropping-shaft 34, that is driven by the sprocket-gearing from the rotary axle of the covering and presser roller. This insertible hopper is secured within the primary hopper by the removable fastener 74, and the dished or inclined bottom of said insertible hopper is formed with a central longitudinal slot 75. The corn-dropping disk 76 has its hub 77 fitted to the dropping-shaft 34 and secured thereto by a set-screw 78, so as to make the disk occupy a vertical plane immediately below the slot 75 in said hopper. The disk 76 is provided with a series of radial pockets, in which are received grains of corn as they pass through the slot in the hopper 73, and these pockets are spaced at uniform distances around the circumference of the disk 76, so as to deposit the grain at regular intervals in the ground. In practice I arrange the pockets 79 at such distances apart and drive the shaft 34 and disk 76 at a rate of speed to plant the corn at intervals of six inches; but said disk 76 is constructed to vary the number of pockets that may remain in service, and thus the machine may be changed or adjusted to plant the corn at intervals of twelve or eighteen inches. This end is attained by the employment of the adjustable plugs or followers 80, which are adjustably secured in the pockets 79 and are adapted to be moved to positions flush with the circumference of the disk or to be depressed within such circumference and produce the pockets.

The insertible hopper 73 is provided with means which prevent the too rapid escape of the corn from the hopper, and to this end I provide on the lower or under surface of the insertible hopper a pair of brush-carrying plates 81. These plates 81 support the brushes 82 at their adjacent inner ends and at the terminals of the slot 75 in the hopper-bottom, and said plates 81 are formed with the longitudinal slots 83, through which pass the securing bolts or screws 84, which serve to adjustably attach the plates and brushes to the hopper, and thereby vary the amount of corn which may pass from the hopper to the disk. The plates are adjusted in oppositely-inclined directions from the hopper-bottom, and they sustain the brushes 82 in close relation to the circumferential edge of the disk 76.

In planting corn the gage-plates of the variable cut-off are adjusted away from the disk, so as to leave a considerable space between the disk and the sides of the hopper; but when the machine is to be used for dropping cotton-seed or distributing fertilizer I find it necessary to detach the insertible hopper 73 and the corn-dropping disk 76. The fastener for the sprocket-gear 32 on the dropping-shaft 34 and the screw 78 for the dropping-disk 76 may be released and the shaft 34 withdrawn from one side of the hopper, thus permitting the dropping-disk 76 to be detached and its place supplied by an agitator-wheel 85, after which the shaft should be replaced and the sprocket-gear again tightened thereon. This agitator-wheel 85 is held securely in a central position on the dropping-shaft 34 by a clamping-screw 86, and said wheel 85 is provided with a series of radial teeth 87, that project into the contents of the hopper. As the insertible hopper 73 is withdrawn from the primary hopper it is necessary to adjust the gage-plates 58 59 to form a bottom to the hopper 18 and make the latter sustain the fertilizer or cotton-seed. This adjustment of the gage-plates is readily effected by turning the handle 68 to rock the shaft 65, which, through the lever 64, shifts the positions of said gage-plates relatively to the agitator-wheel 85. As both gage-plates are supported by the idle-levers 60 and properly connected with the lever 64, said plates are adjusted simultaneously in opposite directions and to a uniform extent, and such adjustment of the gage-plates forms in the bottom of the hopper a slot or opening through which the cotton-seed or fertilizer may readily pass into the spout 55. To keep the covering-roll free from accumulation of soil, I provide a scraper-blade 88, which is rigidly secured to the rear bar 7 of the planter-frame and is provided with a convex lower edge adapted to work in the groove of the covering and presser roller.

Slight changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

1. The combination of a hopper, a spout depending therefrom and arranged to provide an intermediate space or opening to accommodate a variable cut-off mechanism, the hanger-arms fixed to opposite walls of the hopper, connecting-levers pivoted centrally to said hanger-arms and supported thereby below the hopper, laterally-adjustable gage-plates arranged in the space between the hopper and the spout and pivoted to the connecting-levers, a vertical shaft supported on the hopper, and an operating-lever fixed to said shaft and pivoted to the gage-plates for adjusting the latter, substantially as described.

2. The combination of a hopper, a spout depending therefrom, the hanger-arms fixed to the hopper, connecting-levers pivoted centrally to said hanger-arms, the laterally-adjustable gage-plates arranged between the hopper and its spout and pivoted to the connecting-levers, a horizontal holding-segment fixed to the rear of the hopper and having the notched upper edge, the vertical shaft supported on the hopper and provided with a bowed spring-arm arranged to traverse and engage with the notched edge of the segment, and an operating-lever fixed to said shaft and pivoted to the gage-plate for adjusting the same, substantially as described.

3. In a planter, the combination with a stock and an opener-shovel clamped thereto, of the sweep having its blades disposed obliquely to the plane of the shovel and clamped to the stock to extend rearwardly from said shovel, and a horizontally-arranged pressure-gage attached to the stock in rear of the shovel and between the oblique wings of the sweep, substantially as described.

4. In a planter, the combination with a stock, an opener-shovel attached thereto and a sweep, of a horizontally-arranged pressure-gage attached to the stock in rear of the shovel and between the blades of said sweep, said pressure-gage having the upwardly and outwardly flared side faces, and a segmental prow which faces toward the rear of the opener-shovel, substantially as described.

5. In a planter, the combination with a stock, and an opener-shovel attached thereto, of the sweep fastened to the stock with its blades disposed obliquely to the shovel, and the cover-blades fastened to the stock above the sweep and shovel and having their free rear ends deflected or turned inwardly to face each other and throw the soil inwardly upon the furrow opened by the shovel, substantially as described.

6. In a planter, the combination with a stock or foot, and a furrow-shovel, of the presser-gage having the curved prow and the upwardly-inclined faces, and a hanger fastened to the gage and clamped adjustably to the foot in rear of the shovel, substantially as described.

7. In a planter, the combination with a foot or stock, of a shovel and a sweep united by a common bolt to the stock for adjustment vertically and uniformly thereon, and a presser-gage adjustably clamped by the same bolt to the stock and adjustable independently of the sweep and opener, substantially as described.

8. In a planter, the combination with a foot or stock, of a transverse carrying-bar clamped to said foot or stock for adjustment vertically thereon, and covering-shovels attached to the carrying-bar, substantially as described.

9. In a planter, the combination with a foot or stock, of a transverse carrying-bar secured thereto, and covering-shovels clamped to the carrying-bar and adjustable thereon laterally in respect to each other, substantially as described.

10. A planter comprising the frame, a primary hopper fastened to said frame and having a depending spout with an intermediate slot, the hanger-bolts fastened to the hopper and carrying the levers, the cut-off plates arranged in said slot and pivoted to the levers to be adjusted thereby to variable positions across the slot, a shaft journaled in the hopper above the cut-off plates, a disk clamped removably to said shaft to rotate therewith and arranged in the plane of the space between said plates, an insertible hopper secured removably in the upper part of the primary hopper and having an open bottom to receive said disk, and brushes clamped to the under side of the removable hopper and adapted to sweep the face of the disk, substantially as described.

11. In a planter, the combination with a foot or stock, and a furrow-opener, of a vertically-adjustable gage mounted on the stock, a vertically-adjustable carrying-bar mounted on the stock independently of the gage, and covering-shovels supported by the carrying-bar, substantially as described.

12. In a planter, the main frame consisting of bent bars having their front portions united rigidly together and their rear portions spread or spaced in parallel relation, an intermediate brace secured to the spaced rear lengths of said frame-bars, and an inclined rear bar secured to the extremities of the frame, in combination with a hopper having a front strap secured to the frame and attached at its rear side to the intermediate cross-bar, handles attached to the frame, braces secured to the handles and frame and depending below the latter, a covering-roller journaled in said pendent ends of the braces, and a dropping-shaft journaled in the hopper and geared to the axle of the covering-roller, substantially as described.

In testimony that I claim the foregoing as my own I have hereto affixed my signature in the presence of two witnesses.

WILLIAM M. PENDLEY.

Witnesses:
C. N. KING,
L. W. THOMPSON.